Figure 1:
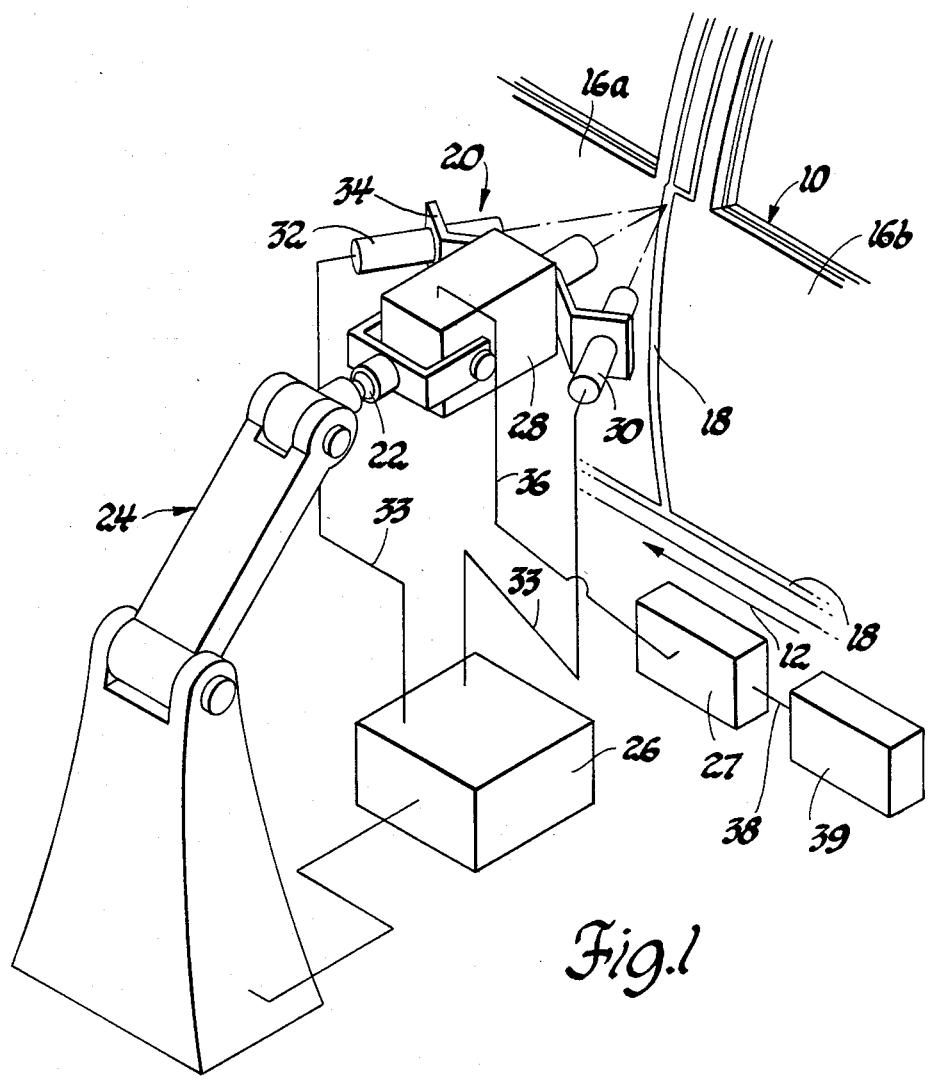

United States Patent [19]

Smith

[11] Patent Number: 4,498,776
[45] Date of Patent: Feb. 12, 1985

[54] ELECTRO-OPTICAL METHOD AND APPARATUS FOR MEASURING THE FIT OF ADJACENT SURFACES

[75] Inventor: Paul R. Smith, Ortonville, Mich.

[73] Assignee: General Motors Corporation, Detroit, Mich.

[21] Appl. No.: 410,401

[22] Filed: Aug. 23, 1982

[51] Int. Cl.³ .............................................. G01B 11/14
[52] U.S. Cl. .................................... 356/375; 376/376
[58] Field of Search ........................ 356/375, 376, 4, 1

[56] References Cited

U.S. PATENT DOCUMENTS

| | | | |
|---|---|---|---|
| 3,187,185 | 6/1965 | Milnes | 356/1 |
| 3,773,422 | 11/1973 | Stavis et al. | 356/1 |
| 3,802,774 | 4/1974 | Eschler et al. | 356/4 |
| 3,976,382 | 8/1976 | Westby | 356/376 |
| 4,105,925 | 8/1978 | Rossol et al. | 356/376 |
| 4,198,164 | 4/1980 | Cantor | 356/375 |

Primary Examiner—R. A. Rosenberger
Attorney, Agent, or Firm—Warren D. Hill

[57] ABSTRACT

To measure the flushness and the gap width between adjacent spaced panels, a pair of light sources project beams of light onto the respective panels adjacent the gap at oblique angles to the panels to provide on each panel an illuminated region extending from the gap to a sharply defined boundary so that for a given position of the gap relative to the light beams outer margin the width of the illuminated portion of each panel transverse of the gap is a function of the position of each panel in relation to the light source and the relative positions of the outer margins depend upon the flushness of the panels. In the preferred form an electronic camera comprising a linear photodiode array receives an image of the illuminated pattern, the optics being such as to provide a sharp image within a predetermined range of flushness. The apparatus, in the preferred form, senses the position of the central gap-produced dark portion of the image and activates the measurement when the same is centered at an image position substantially on the central plane of the unit and is electronically controlled so that when the image is centered the camera measures the widths of the illuminated portion on each pattern. The outer edges of the image and the edges of its central dark portion, at the time of such activation respond to the flushness of the panels and the width of the gap. In the preferred form, computer means responsive to the photodiode array provides a readout of gap width and flushness. The light source and camera are mounted together and preferably carried by a manipulator or robot for easy positioning at desired portions of the panels which may be stationary or moving on a conveyor.

11 Claims, 5 Drawing Figures

ELECTRO-OPTICAL METHOD AND APPARATUS FOR MEASURING THE FIT OF ADJACENT SURFACES

This invention relates to optical and electronic apparatus and a method for measuring the relative positions of two closely spaced surfaces and more particularly to such a method and apparatus for measuring the size of a gap between the surfaces and for measuring the flushness of the surfaces.

In the assembly of large structures, for example automotive vehicle bodies, it is required for quality control purposes to gage the fit of adjacent parts such as the fit between two adjacent doors or between a door and a pillar or a rocker panel. The proper fit of such parts requires that the gap between them be neither too wide nor too narrow and that the parts be flush at their adjacent edges, that is, be substantially aligned in the same plane. It is also desirable in certain assembly operations to measure the position of the surface of a part relative to a standard reference surface. Such measurements are commonly made by mechanical gages manually applied by an operator to contact the parts and which are read by the operator. Such inspection techniques are slow and expensive and subject to many inaccuracies so that the inspection of many different points on a vehicle body, for example, is impractical. It is also desired that the measurement results during such inspection be in such a form that they are immediately available for comparison with standard tolerances to determine in real time whether the article being produced meets the design requirements. This allows immediate correction of any errors on the part being inspected and, in addition, allows correction of assembly procedures or calibration of assembly tools which precede the inspection station.

According to the present invention, the above recited inspection needs are met by implementing optical range finding and dimension measuring techniques combined with electronic sensing and calculation techniques. In the broad sense, this is already known since optical triangulation methods and apparatus have been used for range finding purposes and optical imaging for dimension measurement. By and large such techniques were able to render accurate results only when an accurate control of certain distances was maintained. For example, in the usual triangulation method an accurate fixed triangle base distance is required. It is desirable, however, to make the required measurements on a part as it is moving past an inspection station and even swaying to and fro with respect to the optical apparatus so that a known distance from the sensor to workpiece cannot be maintained. It is also desirable that the sensing apparatus be quickly movable from one position to another in order to sequentially take many measurements on the assembly under scrutiny while that assembly is moving along at a normal conveyor speed.

Therefore, a general object of this invention is to provide a method and apparatus for accurately measuring the relative position of one surface to another without contacting the surfaces. Another object of the invention is to provide a noncontact method and apparatus for measuring the fit between two spaced panels even though the panels are in motion.

The invention is carried out by projecting a pattern of light at oblique angles onto first and second surfaces which are separated by a gap, the light pattern having sharp boundaries spaced from the gap so that the distance of each boundary from the gap depends upon the position of each panel with respect to a reference plane, and the relative distances to the sharp boundaries is a function of the flushness of the panels, viewing the illuminated panels with an electronic camera which produces electrical signals representing the distances and measuring in the image plane of the camera the gap-to-boundary distances and comparing those distances to determine the flushness of the surfaces. The invention also comprehends measuring the size of the gap between the surfaces on the basis of the camera signals.

The invention is further carried out by providing at least one light projector for focusing a pattern of light onto two surfaces separated by a small gap, the light being projected at an oblique angle to the surfaces so that the size of the light pattern on each panel is dependent on the spacing of the panel from a reference plane so that relative image sizes on the panels vary in accordance with the flushness of the surfaces, an electro-optical detector positioned to view the illuminated surfaces and to produce output signals representing the light pattern on the surfaces, and electronic circuitry responsive to the output signals and arranged to measure and compare the image sizes on the surfaces to determine the flushness of the surfaces. The invention further comprehends the measurement from the output signals the size of the gap between the surfaces. It also comprehends that the light projector and the detector be mounted as a unit and carried by a manipulator to rapidly position the unit for measurement at desired locations.

Figure 2:
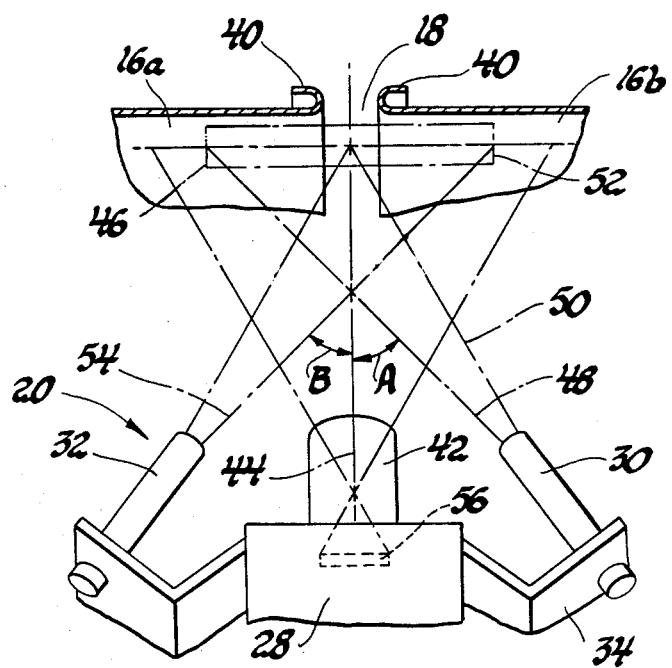
Figure 3:
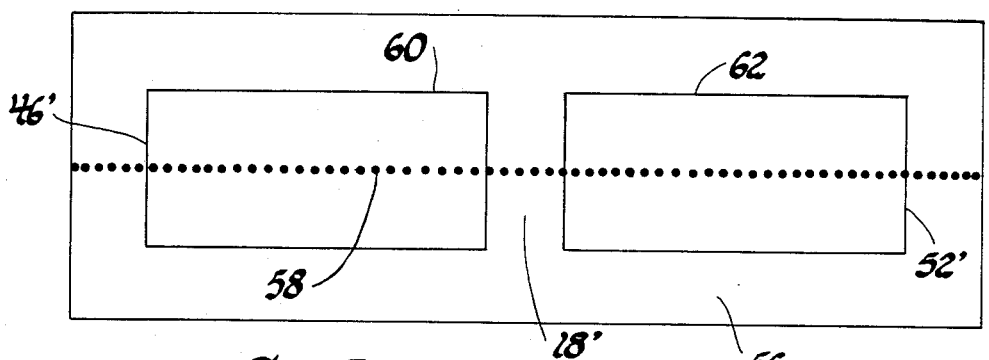
Figure 4:
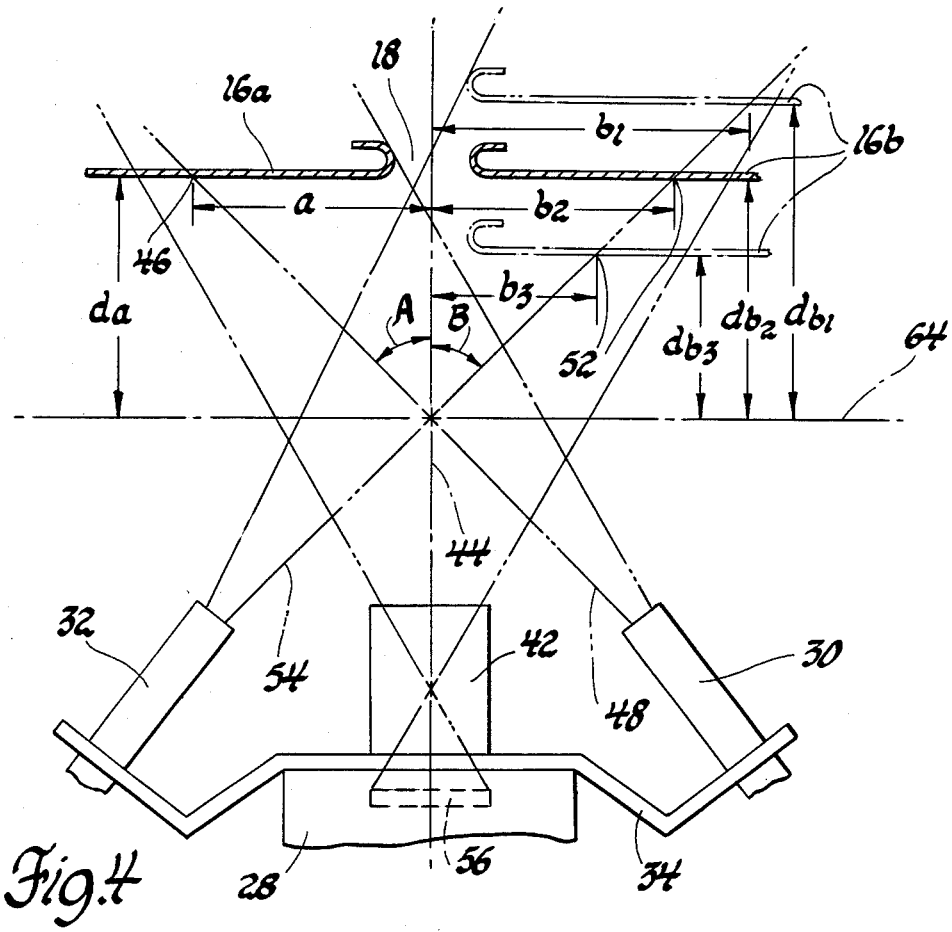
Figure 5:
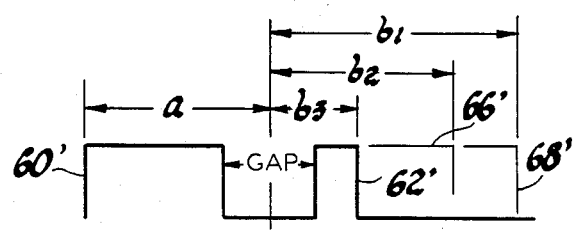

The above and other advantages will be made more apparent from the following specification taken in conjunction with the accompanying drawings wherein like reference numerals refer to like parts and wherein:

FIG. 1 is a view of a system according to the invention for measuring the fit of panels on an automotive body assembly, FIG. 2 is a view of an optical sensor according to the invention positioned with respect to a pair of panels for measuring the fit of the panels, FIG. 3 is a schematic view of a light pattern focused onto a photodiode array in the camera of FIG. 2, FIG. 4 is a plan view of the sensor and panels of FIG. 2 illustrating the effect of panel offset on the light pattern, and FIG. 5 is a graphical representation of the camera electrical signal which shows its correlation to the light pattern on the panels.

FIG. 1 shows an automotive vehicle body 10 at some stage during its assembly. The body is mounted on a conveyor for movement in the direction of the arrow 12. The body includes door panels 16a and 16b which are separated from each other and from the surrounding body surfaces by gaps 18. To assess the quality of the body and the integrity of the procedures and tooling used to fashion the body, it is desired to measure the position of the door panels 16 relative to each other and to the adjoining surfaces of the vehicle. To this end, an optical apparatus or sensor 20 is mounted on the wrist 22 of an industrial robot or programmable manipulator 24. The manipulator is controlled by an electronic controller 26 to position the optical apparatus opposite those parts of the body where the panel fit is to be checked. The robot 24 can be programmed to move the optical unit from one body point to another in rapid succession to make many measurements on each body while the body is moving along the conveyor path.

The optical sensor 20 includes an electronic camera 28 such as an LC 600 series linear diode array camera from the Reticon Corporation of Sunnyvale, Calif. for viewing selected regions of the body, and a pair of light projectors 30 and 32 positioned at either side of the camera for projecting light at an angle to the surface being viewed by the camera 28. The light projectors are supported in a fixed relationship to the camera by a bracket 34. The camera 28 produces electrical output signals on line 36 which is connected to a camera controller 27. The controller 27 contains programmable microprocessor based circuitry for analyzing the camera signals and producing on output line 38 signals which correspond to the fit of the panels at each checked location. The controller 27 is programmable to set tolerance limits, light intensity detection levels, and calibration constants, and to establish the camera signal processing necessary to determine the panel fit dimensions in accordance with the relationship discussed below. The controller 27 also includes an elementary pattern recognition capability which can sense when an image of the gap 18 is centered on the diode array. An output device 39 coupled to an output 38 of the controller 27 comprises a display to provide a readout of the measurement, a warning device for signalling when the measurements are outside set limits, and/or a storage unit to store the data for future use.

The light projectors 30 and 32 are connected by lines 33 to the controller 26 for supply of power thereto. Each projector is a straight forward image projector design having an incandescent lamp, a mask defining a rectangular aperture, and projection lenses to cast an image of the aperture onto the panels.

To further illustrate the invention, FIG. 2 shows a broken away close-up view of the door panels 16a and 16b separated by the small gap 18. Each edge of the door panel is rolled back to form a hem flange 40. The camera 28 is shown having a lens 42 focused on the panels in a direction generally normal to the panels and aligned with the gap 18. The centerline 44 of the camera comprises the centerline of the optical sensor; and as illustrated in FIG. 2, the centerline 44 intersects with the centerline of the gap. Although this is not a required condition of operation, it is, however, a convenient condition of operation at the instant the panel fit measurement is made. The light projector 30 projects a rectangular pattern of light on the panel 16a extending from the edge of the panel to a boundary 46 spaced from the edge. That boundary 46 of the light pattern must be sufficiently sharp that it can be resolved by the camera 28. The edge 48 of the light beam which forms the boundary 46 is set at a fixed angle A with respect to the centerline 44 of the camera 28. The opposite edge 50 of the light beam diverges from the edge 48 enough to assure that the light pattern extends fully to the edge of the panel 16a and indeed may overlap onto a portion of the panel 16b. Thus, as shown, the light beam from the projector 30 crosses the centerline of the camera and impinges on the panel 16a at such an angle that it "wraps around" the edge of the panel to assure that the edge is fully illuminated from the point of view of the camera. The vertical height of the illuminated rectangle is not critical, it being sufficient if the camera is readily focused on the illuminated region. In addition, the sharpness of the upper and lower boundaries of the illuminated region is not important. The light projector 32 casts a rectangular light pattern on the panel 16b forming a sharp boundary 52 spaced from the edge of the panel 16b, that boundary being formed by a light beam 54 which is set at a fixed angle B with respect to the camera centerline 44. It is preferred that the angles A and B be equal, however, that is not essential to the operation of the system. The light beams from projectors 30 and 32 are in all respects equivalent and those beams should overlap sufficiently to provide a complete rectangle of light in the event they were projected upon a solid surface. The beams must not, however, overlap sufficiently for one to obfuscate the sharp boundary 46 or 52 of the other beam.

The lens 42 of the camera 28 focuses an image of the light pattern onto an image plane 56 in the camera 28. The lens 42 has a large depth of field in order to minimize the effect of variations in the camera-to-panel distance. In practice, the panels are nominally spaced six inches from the lens. The parts may move laterally two inches as they are being carried by the conveyor. That is, there may be motion toward or away from the lens. By using a lens with a large depth of field, say, one inch, the effect of part sway is minimized and accurate results are obtained. For example plane alignment or panel flushness can be measured within 0.006 inch.

The camera 28 is a type of one dimensional solid state camera comprising a linear series of photodiodes each of which responds to the presence of light. The linear diode array cameras such as the Reticon LC 600 series are available in various resolutions, typically containing, for example, 128 or 1,024 photoelements. The linear diode arrays are accompanied by electronic circuitry for sequentially scanning the array elements to provide either digital or analog video signals indicating the illumination level of each element as well as clocking and synchronizing pulses. The sequential scanning occurs so rapidly that the camera, in effect, records an instantaneous signal representing the light pattern focused onto the diode array. As shown in FIG. 3, for example, the image plane 56 includes a single row of photodiodes 58, each represented by a dot. For convenience of illustration, the optical inversion taking place in the camera is not taken into account in the drawings. The rectangular patterns of light on the panels 16a and 16b are represented in the image plane by the rectangles 60 and 62 separated by a dark band 18' representing the gap 18. The rectangles are bounded at their extreme ends by sharp boundaries 46' and 52' in the image plane which, of course, represent the boundaries 46 and 52 of the light pattern on the panels. The diode signals are analyzed to distinguish those diodes that are above or below a preset light intensity so that groups of diodes will represent light or dark areas. The part sway may move the light pattern outside of the zone where sharp images will be obtained in the camera. If this occurs a sharp boundary 46 or 52 will be blurred to some extent and will appear in the image plane as a sloped light intensity gradient rather than a step function. By adjusting the light level detector of the camera to a value midway on the gradient, the boundary image can still be recognized.

FIG. 4 illustrates geometrically the effect of offset of panel 16b with respect to 16a on the illumination pattern. For this illustration the angle A equals angle B and the centerline of the camera intersects the centerline of the gap 18. The panel 16a is held in its fixed position so that the distance "a" of the boundary 46 from the gap centerline is a constant value.

In this symmetrical optical arrangement a reference plane 64 is established parallel to the panels and passing through the point at which the light beams 48 and 54 cross the camera centerline 44. Then the distance $d_a = a/\tan A$. The panel 16b is shown in three different positions, one of them flush with panel 16a and the others spaced by a distance or offset from the flush position. This offset is greatly exaggerated in the drawing for clarity of illustration. For the case where the panel 16b is nearest the camera, only a small portion of the panel is illuminated by the light from projector 32 so that the boundary of the light is a relatively short distance "$b_3$" from the gap centerline and this corresponds with the relatively short distance $d_{b3}$ of the panel from the reference plane 64. For the panel position flush with panel 16a, the distance $b_2$ is equal to "a" and so also the distance from the reference plane 64 $d_{b2}$ is equal to $d_a$. For the panel position furthest from the camera, a very large area defining a distance $b_1$ is illuminated and there is a correspondingly large distance $d_{b1}$ from the reference plane 64. The general expression of the distance of the panel 16b from the reference plane 64 is $d_b = b/\tan B$. The general expression of the offset or flushness of the panels is, of course, $d_a - d_b = (a/\tan A) - (b/\tan B)$ which reduces to $K(a-b)$ where the angles are equal and are constant.

In FIG. 5, which diagrams the photodiode excitation as being "on" when illuminated (above a preset level) and "off" when dark, the diodes illuminated by the image of the illuminated portion of panel 16a are represented by a square wave 60' spaced from a corresponding square wave 62' representing the illuminated portion of panel 16b while the intervening space represents the gap 18 between the panels. When the edges of the square waves representing the gap margins are equally spaced from a central diode the gap image is centered on the diode array. By electronically counting the diodes from the center of the gap to the extreme edge of the square wave 60', the distance "a" can be measured. The various distances $b_3$, $b_2$ and $b_1$ of the illuminated boundary 52 from the gap centerline as illustrated in FIG. 5 by the regions 62', 66' and 68' respectively are similarly measured and subtracted from the distance "a". The offset expression $K(a-b)$ is realized in real dimensions by a simple calibration procedure. Standard panels with a known offset are measured with the apparatus so that the value of the constant K can be obtained to obtain an output in millimeters or in inches. For the optical geometry given in FIG. 4 panel flushness is readily determined electronically by subtracting the number of diodes illuminated on one side of the gap centerline from the number of diodes illuminated on the other side of the gap centerline and multiplying by a constant. Of course, the gap size is readily determined by counting the number of dark diodes between the illuminated ones. A calibration procedure similar to that for offset calibration will establish the numerical relationship of the number of dark diodes to the desired gap dimension. So long as the light patterns on the panels are substantially focused onto the camera image plane, changes of panel-to-camera distance are of small consequence and where the large depth of field lens is employed large variations in the panel-to-camera distance do not significantly detract from accurate measurements.

Since the distances "a" and "b" depend upon the angles of the light beams and the distance of the panels from the reference plane 64 which is also determined by the light beams, there is considerable design freedom regarding camera placement. While the drawings show the camera to be positioned in the plane or band defined by the light beams and equally spaced between the light beams, such constraints are not necessary. The camera, in fact, may be laterally offset to look in sideways at the light pattern or it may be vertically offset to look at an inclined angle to the light pattern. The lighting arrangement using two crossed light beams is preferred but it is not the only way of establishing the light pattern on the panels. A pair of beams which are not crossed so that the right beam illuminates the right panel and the left beam illuminates the left panel may also be used. In either case the beam edge which projects onto the pattern boundary 46 or 52 must be at a significant angle to the panel surface in order to realize an appreciable change in the gap-to-boundary distance when the panel distance d changes. An alternative single divergent beam illuminating both panels may be used. The light source may be symmetrically located, that is, aligned with the gap centerline, or it may be laterally offset to provide an asymmetric beam. The alternate versions of the optical arrangement may have less simple mathematical expressions for the flushness calculations, however, the derivation is straightforward and readily implemented by electronic circuitry.

In practice, the desired measurements may be accomplished by setting up the optical sensor with the gap 18 centrally aligned with the camera and then electronically reading the image with the panels stationary relative to the camera. A much more likely usage of the system, however, would be with the panels moving relative to the camera or even with the camera and panels both moving with some degree of relative motion. For example, with reference to FIG. 1 with the vehicle body 10 moving in the direction of the arrow 12 and the controller 26 tracking the body sufficiently to know the position of the body the robot will move the optical unit to a position slightly in advance of a gap to be measured so that due to body travel the gap image will traverse across the image plane of the camera. When the gap centerline reaches the central photodiode of the diode array or some other preselected diode as detected by the position of the dark band on the array, the controller 27 will instantly read the image so that the electrical signals representing the gap dimension and the distance of the sharp boundaries of the light pattern from the gap centerline are instantly processed for utilization as desired. Then the robot is free to immediately move the optical sensor to another gap location so that during the passage of the vehicle body many measurements can be made with the single camera. In the case of those gaps which are horizontal, the conveyor movement will not cause sweeping of the image across the camera image plane and in that case it will be necessary for the robot to turn the camera so that the diode array will be perpendicular to the gap centerline and to move the optical unit vertically to affect the necessary sweep of the image across the linear diode array.

The data thus garnered by the sensing device may be used by the output device 39 to display the measured dimensions, it may be automatically compared with preset standards to determine whether the panel fits are within design tolerance to provide a go/no-go indication, or it may be otherwise stored or processed for quality control purposes.

It will thus be seen that the apparatus as described herein performs the method of measuring the relative positions of a pair of surfaces in terms of flushness or alignment of the surfaces in the same plane as well as the spacing between the surfaces by projecting light onto the surfaces at oblique angles to form a light pattern with sharp boundaries spaced from the gap as well as illuminating the edges of the surfaces adjoining the gap so that the relative distances along the line transverse to the gap from the sharp boundaries to the gap is a measure of the flushness of the surfaces, and focusing the light pattern onto the image plane of a light detector which is able to detect the dimensions of the light pattern image and calculating from those dimensions the relative positions of the surfaces in terms of flushness and gap width. It is further seen in this method that the measurement can be effected by causing relative movement between the panels and the optical unit to sweep the light pattern image across an image plane and instantaneously read the dimensions of the image when it is properly positioned in the image plane.

It will further be seen that the method and apparatus according to this invention is effective to optically view a stationary or moving workpiece having spaced surfaces and making accurate measurements of the spacing between the surfaces in terms of gap width and planar offset.

The embodiments of the invention in which an exclusive property or privilege is claimed are defined as follows:

1. The method of measuring flushness and width of gap between two substantially parallel light reflective surfaces, the steps comprising:
    forming an image of the gap and predetermined adjacent portions of the surfaces,
    illuminating the gap and said adjacent portions of said surfaces by a pair of sharply defined beams having inboard beam edges substantially coincident on the gap and outboard beam edges within the said predetermined adjacent portions and at substantial angles to said surfaces so that the span of the image between its outboard edges varies with flushness, and
    measuring the span of said image, said measurement identifying the location of a central dark spot corresponding to said gap and the outer edges of two illuminated regions corresponding to the illumination of adjacent portions of said surfaces by said beams.

2. A method of determining the flushness of a pair of panels having a gap therebetween, the steps comprising:
    projecting a line of light of a length that will illuminate predetermined portions of the panels less than the width of panel and extend across the gap when the panels and line of light have a predetermined relationship, the gap appearing as a relatively dark space, and the relative length of the illuminated regions depending on panel flushness,
    forming an image of the line of light and gap by image producing means as the panels are moved relative to the line of light and image producing means whereby the image varies during said movement, and
    measuring in the image the length of each illuminated region when the variable image is such that the image producing means and line of light have predetermined relationship to the panels.

3. A method of measuring the flushness of a pair of surfaces spaced by a small gap comprising the steps of:
    projecting light onto first and second surfaces at oblique angles thereto respectively in a pattern with sharp boundaries spaced from the gap to illuminate a region of each surface adjacent the gap including the edges of the surfaces defining the gap whereby the relative lengths of the illuminated regions between the sharp boundaries and the gap depend on the flushness of the surfaces,
    forming an image of the illuminated regions including the sharp boundaries onto an image plane, and
    measuring in the image plane the distance of the boundary of each illuminated region from the gap and comparing the two distances to determine the flushness of the surfaces.

4. A method of measuring flushness and width of gap of a pair of panels spaced by a small gap comprising the steps of:
    projecting first and second light beams onto first and second panels, respectively, at substantially equal oblique angles thereto in a pattern with sharp boundaries spaced from the gap to illuminate a region of each panel surface adjacent the gap including the panel edges, whereby the difference of the distances when measured between the sharp boundaries and the gap depends on the flushness of the panels,
    viewing the illuminated regions including the sharp boundaries from a site on a line spaced at substantially equal angles to the beams and focusing an image of the viewed illuminated regions onto an image plane where the small gap appears as a dark space, and
    when the gap image is in a predetermined location in the image plane measuring in the image plane the size of the gap and the distance of the boundary of each illuminated region from the gap and determining the panel flushness by calculating the difference of the measured distances.

5. A method of measuring the fit of a pair of panels spaced by a small gap comprising the steps of:
    viewing portions of the panels adjacent the gap from a viewing site on a line generally perpendicular to the panels,
    projecting light beams onto first and second panels, the beams emanating from opposite sides crossing the line at substantially equal angles to impinge on the respective panels in a pattern with sharp boundaries spaced from the gap to illuminate a region of each panel surface adjacent the gap including the panel edges, whereby the difference of the distances when measured along a line transverse to the gap of the sharp boundaries from the center of the gap depends on the flushness of the panels and the distances are equal when the panels are coplanar,
    focusing an image of the illuminated regions onto an image plane at the viewing site where the small gap appears as a dark space, and
    measuring in the image plane the size of the gap and the distance of the boundary of each illuminated region from the center of the gap and subtracting one distance from the other to determine the panel flushness.

6. A method of measuring the fit of a pair of panels spaced by a small gap comprising the steps of:

projecting first and second light beams from projection means onto first and second panels, respectively, at substantially equal oblique angles thereto in a pattern with sharp boundaries spaced from the gap to illuminate a region of each panel surface adjacent the gap including the panel edges, focusing an image of the illuminated regions onto an image plane, effecting relative movement between the panels and the projection means to sweep the light pattern in a direction transverse of the gap, and when the gap image appears at a predetermined location in the image plane, measuring in the image plane the size of the gap and the distance of the boundary of each illuminated region from the gap whereby the relative distances depend on the flushness of the panels so that the distances are equal when the panels are in the same plane, and finding the difference of the two distances to determine the panel flushness.

7. Optical and electronic apparatus for gaging the flushness of a part surface and a reference surface spaced by a small gap including:

projection means for projecting light onto the surfaces at oblique angles to the surfaces to illuminate a region of each surface including edges adjacent the gap in a light pattern having sharp boundaries laterally spaced from the gap, whereby the relative distances of the sharp boundaries from the gap depend on the flushness of the surfaces, an electronic camera positioned to view the illuminated region and form an image of the light pattern on detector means having output signals responsive to said image, and electronic means responsive to the detector output signals for measuring the distance of each sharp boundary from the gap and finding the difference of the two distances to determine surface flushness.

8. Optical and electronic apparatus for gaging the fit of a pair of panels spaced by a small gap including:

projection means for projecting light onto the panels at oblique angles to the panel surfaces to illuminate a region of each panel including panel edges adjacent the gap in a light pattern having sharp boundaries laterally spaced from the gap, whereby the relative distances of the sharp boundaries from the gap depend on flushness of the panels, an electronic camera positioned to view the illuminated region and form an image of the light pattern on a photoelectric detector means having output signals responsive to said image;

a manipulator movable with respect to the panels supporting the projection means and the electronic camera for positioning the light pattern on the panels, and electronic means responsive to the detector output signals for substantially instantaneously measuring the gap width and the distance of each sharp boundary from the gap when the gap image is at a preset position on the detector means the then calculating the difference of the two distances to determine panel flushness.

9. Optical and electronic apparatus for gaging the fit of a pair of panels spaced by a small gap including:

projection means for projecting light onto the panels of oblique angles to the panel surfaces to illuminate a region of each panel including panel edges adjacent the gap in a light pattern having sharp boundaries laterally spaced from the gap whereby the relative distances of the sharp boundaries from the gap depend on flushness of the panels, an electronic camera having a detector means comprising a linear array of photodiode elements each for producing an output signal in accordance with its level of illumination and a lens positioned to view the illuminated region and form an image of the light pattern on the detector means thereby producing output signals responsive to said image, and electronic means responsive to the detector output signals for measuring the distance of each sharp boundary from the gap and finding the difference of the two distances to determine panel flushness.

10. Optical and electronic apparatus for gaging the fit of a pair of panels spaced by a small gap where the panels are subject to swaying movement toward and away from the said apparatus including:

projections means for projecting light onto the panels at oblique angles to the panel surfaces to illuminate a region of each panel including panel edges adjacent the gap in a light pattern having sharp boundaries laterally spaced from the gap whereby the relative distances of the sharp boundaries from the gap depend on flushness of the panels, an electronic camera including a lens positioned to view the illuminated region and form an image of the light pattern on a photoelectric detector means having output signals responsive to said image, the camera lens having a large depth of field whereby the proportional size of the image formed on the detector relative to the size of the light patterns is substantially independent of the changing spacing due to swaying movement of the panels, and electronic means responsive to the detector output signals for substantially instantaneously measuring the gap width and the distance of each sharp boundary from the gap and then finding the difference of the two distances to determine panel flushness.

11. Optical and electronic apparatus for gaging the fit of a pair of panels spaced by a small gap including:

optical means comprising projection means and an electronic camera fixed relative to the projection means, the projection means for projecting light onto the panels at oblique angles to the panel surfaces to illuminate a region of each panel including panel edges adjacent the gap in a light pattern having sharp boundaries laterally spaced from the gap, whereby the relative distances of the sharp boundaries from the center of the gap depends on flushness of the panels, the electronic camera fixed relative to the projection means and positioned to view the illuminated region and form an image of the light pattern on a photoelectric detector means having output singals responsive to said image, means for effecting lateral relative movement of the panels with respect to the optical means for effectively sweeping the light pattern and camera across the panels, and electronic means responsive to the detector output signals for substantially instantaneously measuring the distance of each sharp boundary from the center of the gap when the gap image is at a predetermined position on the detector means and then subtracting one distance from the other to determine panel flushness.

* * * * *

UNITED STATES PATENT AND TRADEMARK OFFICE
CERTIFICATE OF CORRECTION

PATENT NO. : 4,498,776

DATED : February 12, 1985

INVENTOR(S) : Paul R. Smith

It is certified that error appears in the above-identified patent and that said Letters Patent is hereby corrected as shown below:

Column 9, line 59, "the" should read -- and --.

Column 9, line 65, "of" should read -- at --.

Signed and Sealed this

Twenty-eighth Day of October, 1986

[SEAL]

*Attest:*

DONALD J. QUIGG

*Attesting Officer*  *Commissioner of Patents and Trademarks*